United States Patent
Yeung et al.

(10) Patent No.: US 9,262,367 B2
(45) Date of Patent: Feb. 16, 2016

(54) METHOD AND NETWORK NODE FOR DISTRIBUTING CUSTOMIZED CONTENT

(75) Inventors: Peter Yeung, Kista (SE); Firooz Badiee, Uppsala (SE); Kamilla Asp, Sundyberg (SE); Patrik Wiss, Stockholm (SE); Rickard Damm, Nacka (SE)

(73) Assignee: TELEFONAKTIEBOLAGET LM ERICSSON, Stockholm (SE)

( * ) Notice: Subject to any disclaimer, the term of this patent is extended or adjusted under 35 U.S.C. 154(b) by 636 days.

(21) Appl. No.: 13/029,286

(22) Filed: Feb. 17, 2011

(65) Prior Publication Data

US 2012/0131147 A1    May 24, 2012

Related U.S. Application Data

(60) Provisional application No. 61/415,426, filed on Nov. 19, 2010.

(51) Int. Cl.
*G06F 15/16* (2006.01)
*G06Q 30/02* (2012.01)

(52) U.S. Cl.
CPC ............ *G06F 15/16* (2013.01); *G06Q 30/0269* (2013.01)

(58) Field of Classification Search
USPC ........................................................ 709/219
See application file for complete search history.

(56) References Cited

U.S. PATENT DOCUMENTS

| | | | |
|---|---|---|---|
| 6,487,538 B1 | 11/2002 | Gupta et al. | |
| 2002/0087397 A1* | 7/2002 | Mazza | 705/14 |
| 2006/0062362 A1* | 3/2006 | Davis | 379/100.13 |
| 2008/0059285 A1* | 3/2008 | Hamoui | 705/10 |
| 2008/0077855 A1* | 3/2008 | Lev et al. | 715/236 |
| 2009/0131025 A1* | 5/2009 | Sharma et al. | 455/414.3 |

* cited by examiner

*Primary Examiner* — Andrew Georgandellis
(74) *Attorney, Agent, or Firm* — Patents on Demand, P.A.; Brian K. Buchheit; Scott M. Garrett

(57) ABSTRACT

By using embodiments of the present invention, a targeted advertisement, or other customized content, can be published to a consumer when visiting a website. The consumer is connected to a mobile broadband network and is authenticated and authorized to this broadband network. Further, the consumer is given an Internet Protocol (IP) address of the mobile broadband network and this IP address is used to identify the consumer when the targeted advertisement is determined according to a profile of the consumer.
This is achieved according to embodiments by letting the publisher request a targeted advertisement for a consumer visiting a website of the publisher. The targeted advertisement is found by using the IP address allocated to the consumer device by the mobile broadband network, i.e. the consumer is identifiable by the IP address. By using the mobile broadband operator's ability to map the IP address and the consumer identity a consumer profile of the consumer is found and based on the consumer profile the targeted advertisement can be determined and shown to the consumer. The consumer profile is controlled by the mobile broadband network.

13 Claims, 6 Drawing Sheets

| IP address | Operator Domain | IP address To profile agent |
|---|---|---|
|  |  |  |
|  |  |  |
|  |  |  |

Fig. 2

METHOD AND NETWORK NODE FOR DISTRIBUTING CUSTOMIZED CONTENT

This application claims the benefit of U.S. Provisional Application No. 61/415,426, filed Nov. 19, 2010, the disclosure of which is fully incorporated herein by reference.

TECHNICAL FIELD

The embodiments of the present invention relate to a network and a method thereof for enabling distribution of customized content such as targeted advertisements.

BACKGROUND

Internet advertising has been present for a long time creating a vast market of advertising solutions. The Internet advertising is very mature and with help of search services, search based advertising is introduced. By using keywords and contextual information of the visited websites the ad networks get a hint of the consumers' profile this enables the ad networks to provide more relevant advertisements for a consumer that is surfing a specific website.

Another ordinary, well used, technique is to store information about the consumer in the browser cookie files. The cookie stores browsing data for a web site.

The advertisers and the media agencies that help the brands to reach out with their message has an interest to always reach the most suitable and desirable consumer category. The more information about the consumer the better relevance the brands will get with their advertising activities. To be seen in the right place for the right consumer is the main target for the advertisers.

Today internet traffic in mobile broadband networks is increasing fast. The internet traffic can be analyzed to derive information about subscriber's internet behavior and dynamic subscriber profiles can be created. A challenge for the mobile broadband (MBB) networks operators is to efficiently analyze all this internet traffic information and leverage on the analysis results.

An example of how the analysis results can be used is transmission of advertisements and other customized content exemplified by mobile apps, games, ring tones, movies, music, etc. This is a growing area and has a huge potential to enable advertisers and content providers to provide customized content and advertisements to the consumers. In order to optimize the revenue for the advertisers and content providers, it is important to optimize the distribution of the content by sending each content to the consumers that have consumer profiles that best fit the type of the content. This is referred to as targeted advertising or targeted content.

Today Mobile Broadband (MBB) subscriber identity over internet and especially mobile broadband is not utilized for targeted advertising. However, every MBB subscriber is connected to the MBB and identified by a Mobile Subscriber Integrated Services Digital Network Number (MSISDN) or similar subscriber identity. Further, each MBB subscriber is allocated an IP address. How to bind the IP address of a MBB subscriber to a specific MSISDN is known technology.

Collecting consumer profile data and storing these profiles with the MSISDN as key for a specific consumer is also known technology.

The MBB devices that can be used are normally Netbook, Laptop or Desktop, but it can also be tablets and smartphones etc. that can surf on the web or install an application.

Nevertheless, still today there exists no solution to utilize the consumer profile information such as the consumer demographics as gender and age, behavioral as e.g. high spender and influential for advertising on the Internet.

Consumer information can be detailed and precise or abstracted in consumer segments and it comes from various sources such as analytic/data mining systems, location based systems, and Call Data Records collected from telecom nodes.

The solution on how to recognize the consumer profile on the public Internet and to make it available for purchase and usage towards the advertising industry/market is still an untapped area.

SUMMARY

The object with embodiments of the present invention is to provide a solution for enabling publishers and advertisers to distribute targeted advertisements and other customized content to consumers.

The embodiments of the present invention provide a solution for enabling publishers and advertisers to distribute customized content to consumers which are subscribers of a mobile broadband network.

According to a first aspect of embodiments of the present invention, a method in a network node for providing customized content to a consumer device connected to a mobile broadband network is provided. In the method, a request for customized content for a consumer of a consumer device connected to the broadband network is received. The consumer is identified by an IP address allocated to the consumer device by the broadband network. A consumer profile for said consumer is requested by using the IP address of said consumer, and the consumer profile is received. Consumer profile for said consumer is requested by using the IP address of said consumer. Further, customized content is selected based on the received consumer profile, and the selected customized content is provided to the consumer device.

According to a second aspect of embodiments of the present invention a network node for providing customized content to a consumer device connected to a mobile broadband network is provided. The network comprises a first interface configured to receive a request for customized content for a consumer of a consumer device connected to the broadband network, wherein the consumer is identified by an IP address allocated to the consumer device by the broadband network. The network node further comprises a second interface configured to request a consumer profile for said consumer by using the IP address of said consumer and configured to receive the consumer profile. A processor is provided which is configured to request customized content based on the received consumer profile, and wherein the first interface is configured to provide the selected customized content to the consumer device.

An advantage with embodiments of the present invention is that they provide the operators new opportunities to monetize the consumer profile.

A further advantage is that a new business model for Internet based advertising is possible due to the consumer targeting described according to embodiments.

A yet further advantage is that media agencies/advertisers can get better targeted campaigns.

BRIEF DESCRIPTION OF THE DRAWINGS

FIG. 2 illustrates a table for mapping an IP address of consumer to an IP address of a profile agent of a mobile broadband network to which the consumer belongs.

DETAILED DESCRIPTION

By using embodiments of the present invention, a targeted advertisement, or other customized content, can be published to a consumer when visiting a website. The consumer is a subscriber to a mobile broadband network and can accordingly be authenticated and authorized to this mobile broadband network. Further, the consumer is given an Internet Protocol (IP) address of the mobile broadband network and this IP address is used to identify the consumer when the targeted advertisement is selected according to the consumer profile.

This is achieved according to embodiments by letting the publisher request a targeted advertisement for a consumer visiting a website of the publisher. The targeted advertisement is found by using the IP address allocated to the consumer device by the mobile broadband network, i.e. the consumer is identifiable by the IP address. By using the IP address a consumer profile of the consumer is found and based on the consumer profile the targeted advertisement can be determined. The consumer profile is controlled by the mobile broadband network.

Figure 1A:
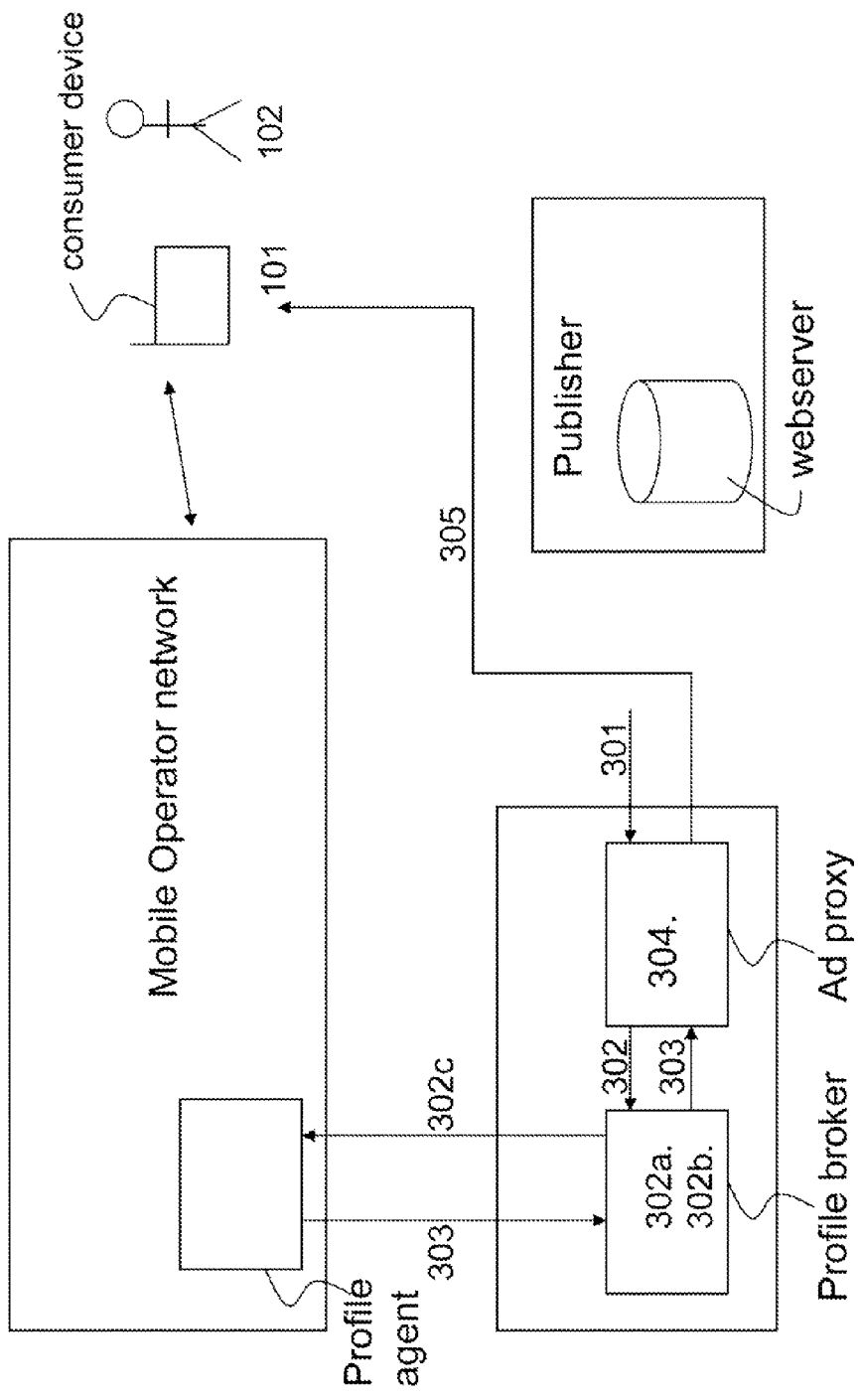
FIG. 1a illustrates a scenario according to an embodiment of the present invention.

Thus as illustrated in FIG. 1a, the request for a targeted advertisement is sent 301 to an advertisement proxy according to one embodiment. It should be noted that advertisement and its abbreviation "ad" are used interchangeably throughout the document, also in combination with e.g. proxy and network. The request comprises an IP address of the consumer, which identifies the consumer. In order to retrieve a profile of this consumer, the advertisement proxy sends 302 a request for the profile of this consumer to a profile broker, wherein the request comprises the IP address of the consumer. The profile broker forwards 302, 302c this request with the IP address of the consumer to a node in the mobile broadband network which the consumer is connected to. The IP address of that node is identified by first identifying 302a the operator domain to which the consumer is a subscriber by using the IP address of the consumer, then the IP address of the node is determined 302b. This node is referred to as a profile agent. The profile agent is configured to map the IP address of the consumer to a mobile broadband operator network identity. By using the mobile broadband operator network identity of the consumer, the profile of the consumer can be retrieved from a profile server. When the profile of the consumer is retrieved, the profile agent returns 303 the profile to the profile broker, which forwards 303 the profile to the advertisement proxy. The advertisement proxy 304 then requests a targeted advertisement from the ad network, wherein the consumer profile is included in the request. The ad network selects an appropriate advertisement according to the consumer profile and then returns the targeted advertisement to the advertisement proxy. The selection 304 of the advertisement may also be performed by the advertisement proxy.

Thus in the description, a consumer is a user having a subscription to a mobile broadband network to which a consumer device of the consumer is connectable to. The customized content is exemplified by targeted ads, i.e. the ads are customized for the consumer according to e.g. demographic data of the consumer.

Figure 1B:
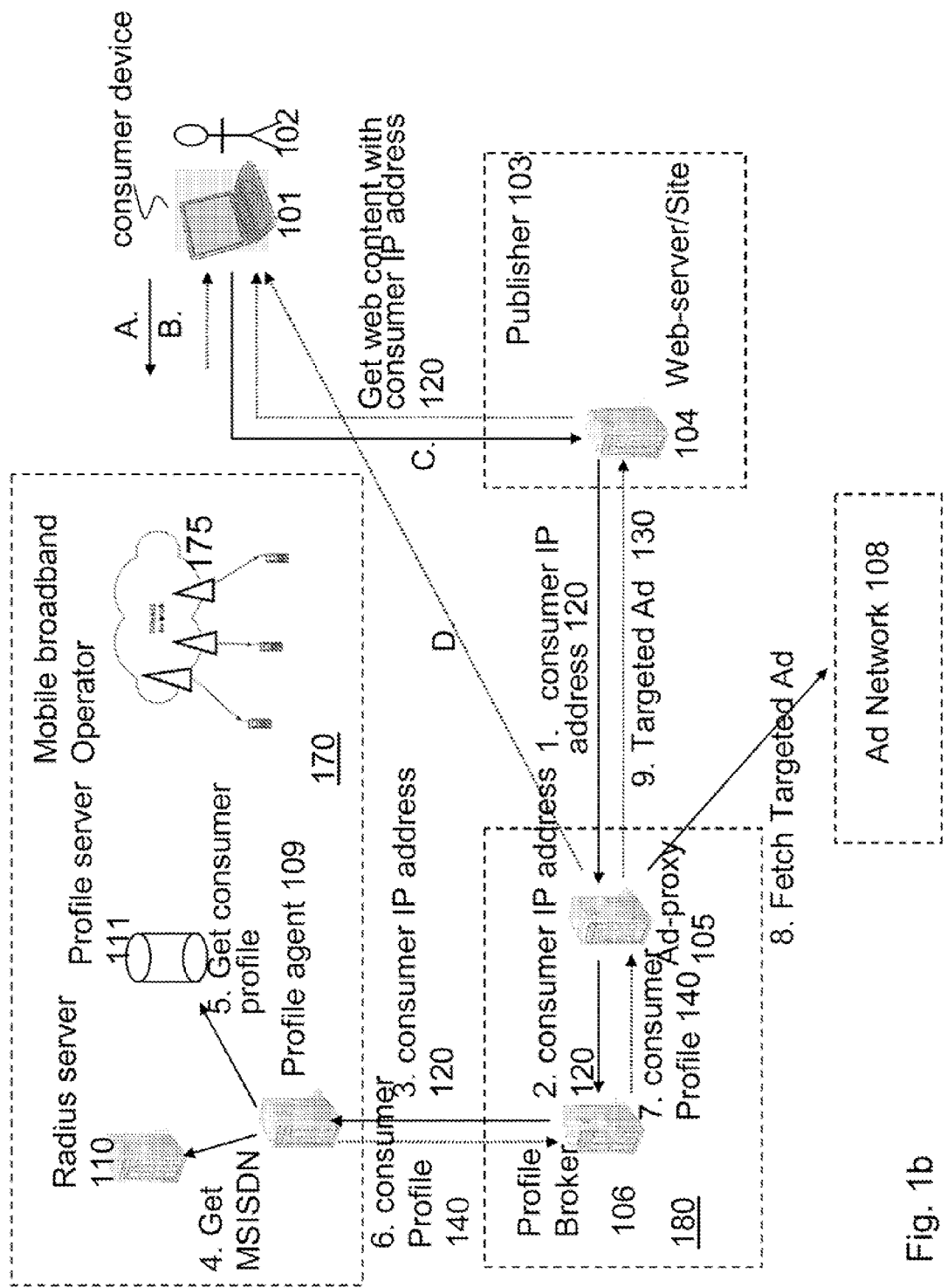
FIG. 1b illustrates a scenario when a consumer is a subscriber to a mobile broadband network according to an embodiment.

An embodiment of the present is further described in FIG. 1b. FIG. 1b illustrates a consumer 102 and a consumer device 101 connectable to a mobile broadband network 170. The mobile broadband (MBB) network comprises radio base stations 175 and other nodes for establishing a connection to the consumer device 101. Further, the MBB 170 comprises core network nodes such as gateways towards the Internet and nodes comprising databases with consumer and location information. FIG. 1b shows a profile agent 109, profile server 111 and a radius server 110 with a database in the MBB 170. These nodes will be further explained below. FIG. 1b also illustrates external network node 180 comprising an ad proxy 105 and a profile broker 106. The ad proxy 105 and the profile broker 106 may be co-located in one node 107, but to illustrate the different logical functionalities these are schematically shown as two separate nodes. This external network 180 is also associated with an ad network 108. The ad network 108 provides advertisements. The purpose of the external network 180 is to provide targeted ads 130 to a requester, e.g. a publisher 103 publishing web sites. It should be noted that the profile agent 109 is introduced according to embodiments of the invention. Furthermore, the embodiments require functionalities in the ad proxy 105 and in the profile broker 106 to provide the targeted advertisement.

It should be noted that there may be multiple MBB networks, or multiple fixed broadband networks, which implies that there may be multiple profile agents. In such scenario, there is only one profile broker and one ad-proxy. Thus, it is possible to obtain consumer profiles from more than one operator.

Steps A-D below and in FIG. 1b illustrate the steps which the consumer 102 and the consumer device 101 are involved in.

A. The consumer 102 is a MBB subscriber in this example and authenticates towards the mobile broadband (MBB) operator network which implies that the consumer 102 and the MBB network 170 are in a trusted relation. Examples of a MBB network 170 is Long Term Evolution (LTE) networks, 3G networks, and GSM networks.

B. When the consumer 102 connects to the MBB network 170, the MBB network 170 returns an IP Address 120 to the MBB Consumer device 101.

C. When the consumer 102 is connected to the MBB network 170, the MBB consumer 102 can initiate a web browsing session and access a publisher web site e.g. http://www.dailymail.co.uk.

D. A targeted advertisement (ad) 130, i.e. an ad customized for the consumer, is displayed on the consumer device of the MBB consumer 102 together with the web site information on e.g. http://www.dailymail.co.uk.

The targeted ad 130 is either sent from the ad proxy 105 to the publisher 103 or directly to the consumer device 101. When the targeted ad 130 is sent directly to the consumer device 101, the consumer device 101 is provided with a java script from the publisher indicating to the consumer device 101 that it should retrieve the targeted ad 130 from the ad proxy 105.

When the consumer 102 accesses the publisher web site 104, the publisher 103 Web Server Serverscript (e.g. delivered from the ad proxy) will detect if the request is from a mobile browser or PC Web browser and also what capability the browser is supporting.

If the request is from a mobile browser, e.g. a WAP browser, of a mobile consumer device 101 then the server script will first fetch the targeted ad 130 from the ad proxy 105 and deliver it to the mobile browser.

If the request is from a Web browser then the server script will deliver a Java script for the Web browser to download the targeted ad 130 from the ad proxy 105.

The following sequence describes in conjunction with FIG. 1b how the ad(s) 130 which should be targeted for the consumer 102 is(are) determined.

1. The ad proxy 105 receives a request for a targeted ad 130. In the request, the IP address 120 of the consumer is included to identify the consumer 102. This request may be received from a publisher 103 or from a consumer device 101 as explained above.

2. The ad proxy 105 requests a Consumer profile 140 from a profile broker 106. The profile broker 106 comprises a database with a mapping between the IP address of the consumer and the Operator to which the consumer is a subscriber of. The database also comprises the mapping between the IP address of the consumer and the IP address of the profile agent of the operator as illustrated in FIG. 2.

3. Thus based on the IP address 120 of the consumer 102, the operator and the IP address of the profile agent 109 of said operator can be determined. The profile broker 106 can also retrieve the operator identity from e.g. an IP reverse lockup service provider (that might be located outside 180). A consumer profile lookup request based on the used IP address is sent to the profile agent.

4. The profile agent 109 fetches a subscriber identity which is used by the MBB network e.g. a Mobile Station International Subscriber Directory Number (MSISDN) based on MBB Consumer IP address 120. This subscriber identity can be fetched from a database, exemplified by a Radius server, in the MBB network.

5. The profile agent 109 fetches a consumer profile 140 based on the subscriber identity exemplified by the MSISDN from a profile server 111. The consumer profile 140 may comprise demographic data of the consumer, such as gender, age, and address. The consumer profile may further comprise interests, behaviour and location of the consumer. The operator of the broadband network 170 controls the profiles of the subscribers of the broadband network. It should be noted that the subscribers of the broadband network are referred to as consumers in this specification.

6. The profile agent 109 returns the consumer profile 140 to the profile broker 106 who caches the information until the IP Address of the consumer expires. Caching the consumer profile speeds up any further consumer profile requests.

7. The profile broker 106 returns the consumer profile 140 information to the ad proxy 105.

8. The ad proxy 105 fetch ad(s) from an advertising network 108 based on the consumer profile information. In one embodiment, the Ad Network selects an appropriate ad based on the consumer profile.

9. The selected ad(s) is(are) displayed on the consumer device embedded in the publisher website http://www.dailymail.co.uk.

If the profile broker does not get a valid operator identity then the profile broker returns this information to the ad proxy. The ad proxy then requests the ad network for a non-targeted ad or a backfill ad. Alternatively the ad proxy requests another ad network for a backfill ad. This ad is delivered to the consumer device as above.

The embodiments are based on utilizing a consumer's identity, an IP address which is further mapped to a subscriber identity used by the mobile broadband network, and the corresponding consumer profile to place a targeted ad on the web site the consumer is browsing by using a mobile broadband connection.

One use case example follow:

Example 1

Alice is living in a town with local supermarkets with different discounts every week. By using her mobile broadband connection, Alice is surfing the web on non supermarket related web sites. Based on Alice's MBB network connection her consumer profile can be identified and the Ad Network serving ads on the website can give Alice a targeted ad from the local supermarket with customized offerings.

The described embodiments are applicable to any appropriate type of fixed and mobile communications networks supporting any suitable communication standards and using any suitable components.

According to an embodiment of the present invention, a method in a network node is provided. The network node is exemplified by a node comprising entities referred to as an ad proxy and a profile broker, as illustrated in FIG. 1a but it should be noted that the functionalities of these entities may be located in one single entity or distributed in more than the two entities as exemplified.

Figure 3:
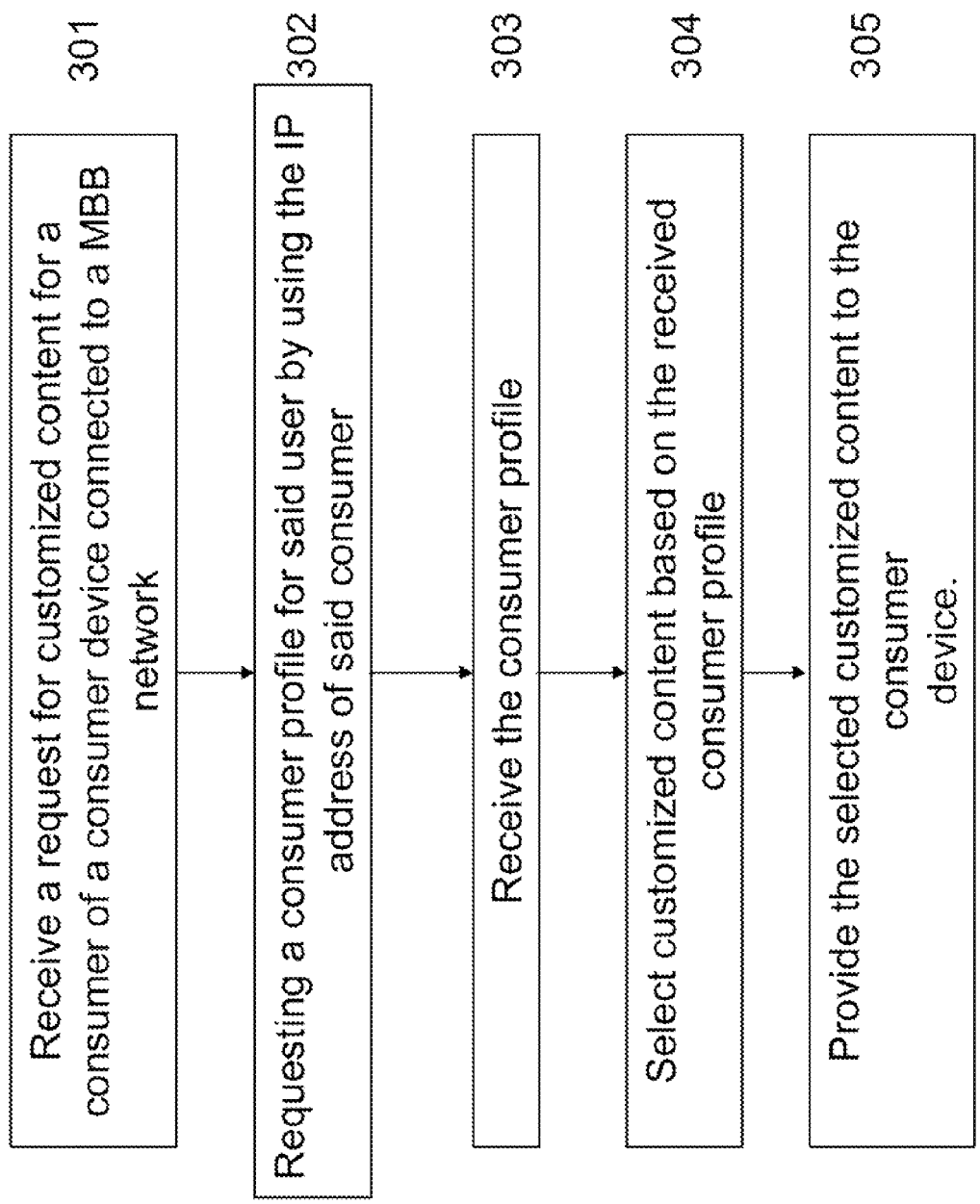
FIGS. 3 and 4 are flowcharts of a method according to an embodiment of the present invention.
Figure 4:
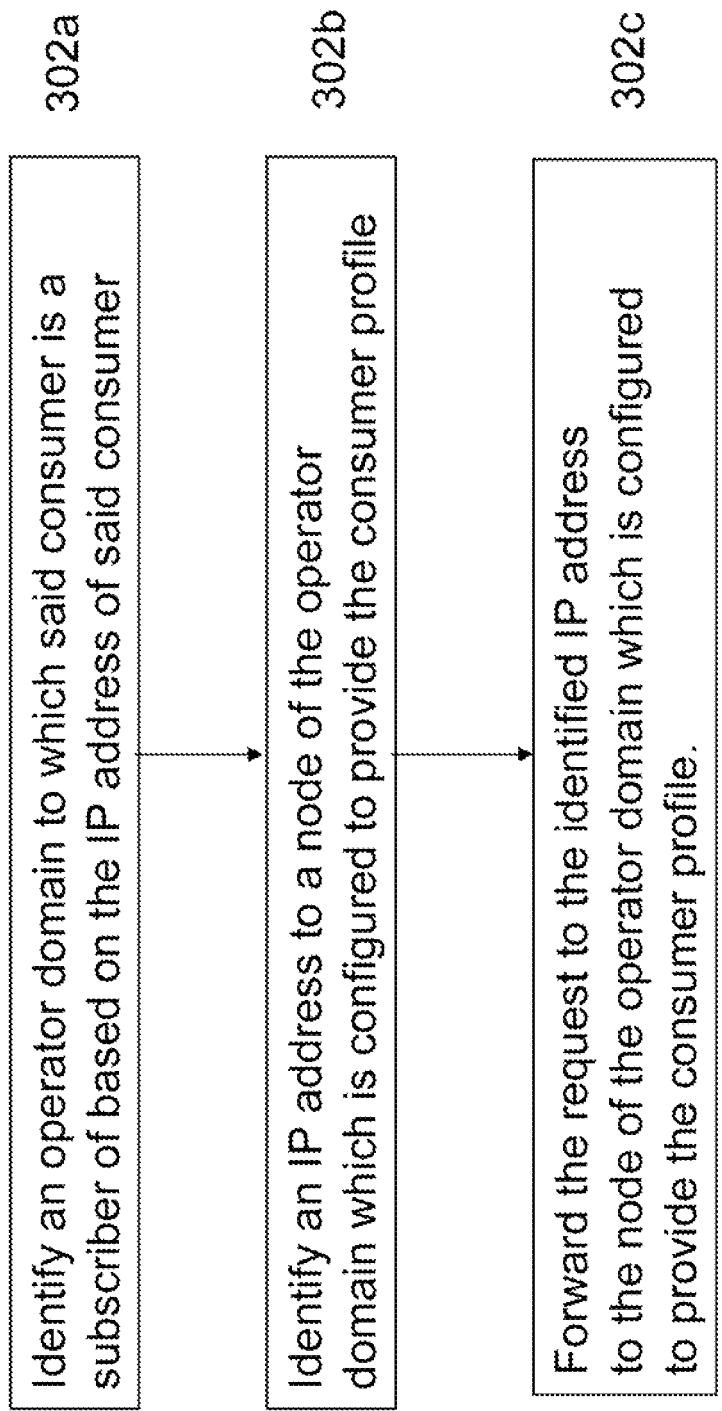

Turning now to FIG. 3, showing a flowchart of the method according to one embodiment. In the method a request is received 301 for customized content for a consumer 102 of a consumer device 101 connected to a broadband network 170. The customized content is exemplified by targeted ads. The consumer 102 is identified by an IP address of the consumer device. A consumer profile for said consumer is requested 302 by using the IP address 120 of said consumer 102 and the consumer profile 140 is received 303. Moreover, customized content is selected 304 based on the received consumer profile 140, and the selected customized content is provided 305 to the consumer device 101, either directly to the consumer device or via the publisher. The customized content may selected by requesting customized content from an ad network. The ad network is provided the consumer profile and selects the customized content e.g. targeted ads based on the consumer profile. The ad network returns the customized content to the ad proxy.

As explained above, the request for the customized content may be received from a publisher or from the consumer device.

The step of requesting 302 a consumer profile for said consumer by using the IP address of said consumer may further comprise identifying 302a an operator domain to which said consumer is a subscriber of based on the IP address of said consumer, identifying 302b an IP address to a node of the operator domain which is configured to provide the consumer profile, and forwarding the request 302c to the identified IP address to the node of the operator domain which is configured to provide the consumer profile. These steps may be accomplished by a profile broker comprising the table as illustrated in FIG. 2. Hence the consumer profile for said consumer can be retrieved by mapping in a profile agent the IP address of said consumer to a subscriber identity used in the operator domain, and retrieving the consumer profile which is associated the consumer identity. According to an embodiment, the subscriber identity used in the operator domain is a MSISDN. The consumer profile is then returned to the profile broker and the ad proxy. In the ad proxy, the consumer profile is used to fetch targeted ad(s) in the ad network for the consumer.

Figure 5:
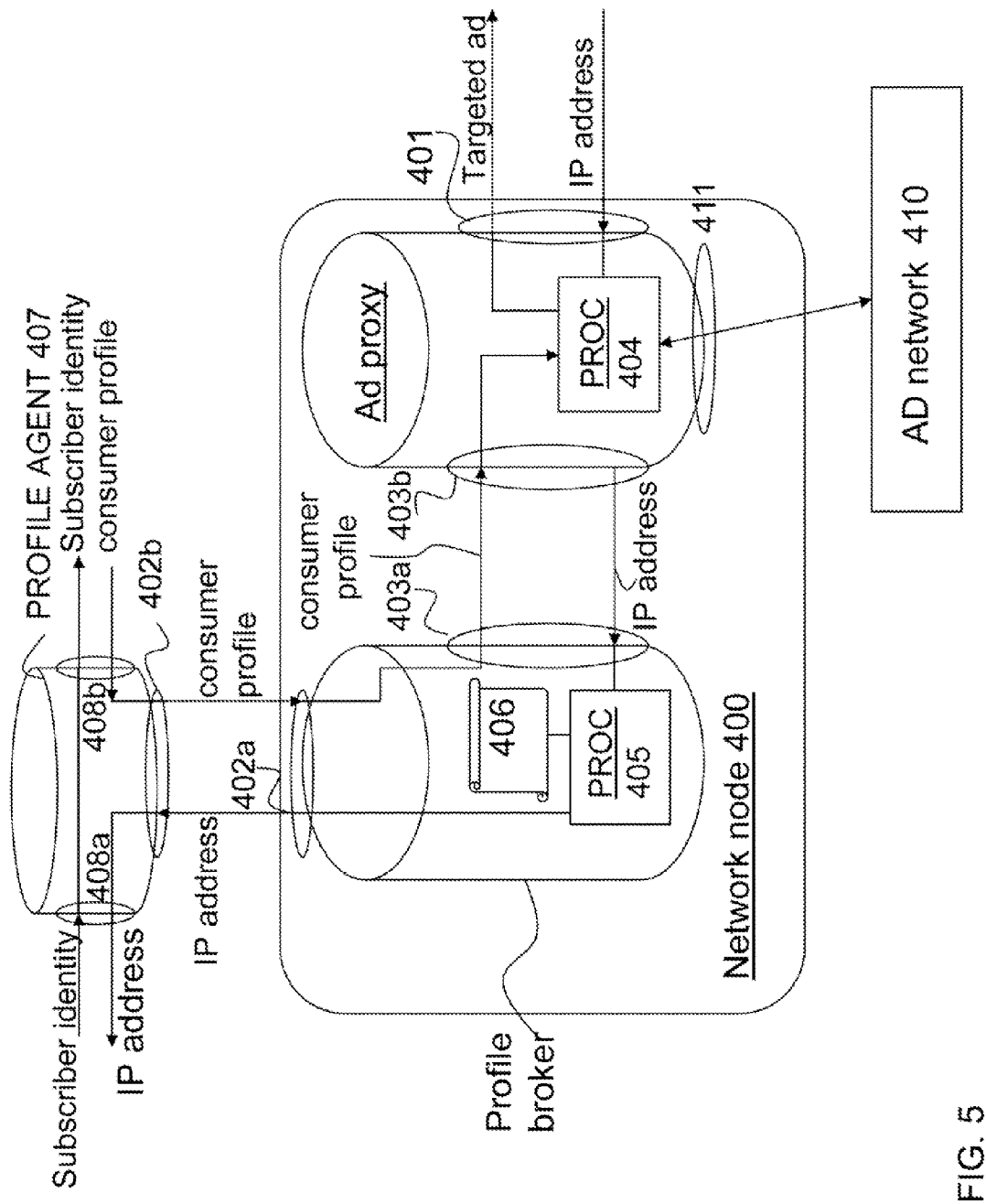
FIG. 5 illustrates schematically network nodes according to embodiments of the present invention.

Turning now to FIG. 5. Accordingly, a network node 400 for providing customized content to a consumer device connected to a broadband network, the network comprises a first interface 401 configured to receive a request for customized content for a consumer of a consumer device connected to the broadband network, wherein the consumer is identified by an IP address allocated to the consumer device by the broadband network, a second interface 402 configured to request a consumer profile for said consumer by using the IP address of said consumer and configured to receive the consumer profile, a processor 404 configured to request customized content based on the received consumer profile, and wherein the first interface 401 is configured to provide the selected customized content to the consumer device. A further interface 411 towards an ad network 410 from where the customized content, e.g. targeted ads, are retrieved is provided.

The first interface 401 is either an interface towards a consumer device or towards a publisher. If the first interface is an interface towards the consumer device, the consumer device connects towards the interface via the broadband network.

According to a further embodiment, the network node 400 comprises a processor 405 configured to identify an broadband operator domain to which said consumer is a subscriber of based on the IP address of said consumer, to identify an IP address to a node of the operator domain which is configured to provide the consumer profile, and the second interface 402 is configured to forward the request to the identified IP address to the node of the operator domain which is configured to provide the consumer profile to request the consumer profile for said consumer. The node of the operator network is referred to as profile agent. A database with a table 406 disclosed in FIG. 2 may be associated with the processor denoted 405. The processor 405 configured to determine an IP address of the node of the operator domain, the table and the second interface 402 may be located, physically or only logically in a separate entity referred to as profile broker while the first interface 401 and the processor 404 configured to request customized content based on the received consumer profile may be located in another entity referred to as ad proxy. If the network node 400 is divided into these two exemplified entities, there is a further interface 403*a*, 403*b* between the profile broker and the ad server.

Accordingly, when the broadband operator is determined the processor 405 use table 406 to retrieve the IP address to the node referred to as profile agent 407 in the operator domain. The profile agent 407 comprises an interface configured to receive a request for a consumer profile of the consumer wherein an IP address of the consumer is provided as input. The profile agent 407 comprises an interface 408 configured to send the IP address of said consumer to a server which is configured to map the IP address to a subscriber identity used in the operator domain and to receive said subscriber identity. The profile agent 407 further comprises another interface 408*b* configured to retrieve the consumer profile which is associated with said subscriber identity used in the operator domain of the broadband network.

The invention claimed is:

1. A method in a network node for providing customized content to a consumer device connected to a mobile broadband network, the method comprising:

receiving a first request from a publisher for customized content for a first consumer device from a publisher, the publisher to provide a first consumer of the first consumer device connected to a first mobile broadband network with publisher content and customized content, wherein the first consumer is identified by a first Internet protocol (IP) address allocated to the first consumer device by the first mobile broadband network;

identifying a first operator domain to which the first consumer is a subscriber via the first IP address of the first consumer device, the first operator domain being associated with the first mobile broadband network and one of a plurality of operator domains;

identifying a first node IP address of a first node in the first operator domain, the first node IP address identified via the identified first operator domain;

using the first node IP address, requesting from the first node in the first operator domain a first consumer profile for the first consumer, wherein the request includes the first IP address of the first consumer device for use in locating the first consumer profile;

receiving the first consumer profile from the first node in the first operator domain;

selecting customized content based on the received first consumer profile;

detecting if a first browser of the first consumer device is a mobile browser or a personal computer web browser and a capability thereof;

providing the publisher with the selected customized content for the publisher to combine with publisher content, the combined customized content and publisher content to be provided to the first consumer device based on the capability of the browser;

receiving a second request from the publisher for customized content for a second consumer device, the publisher to provide a second consumer of the second consumer device connected to a second mobile broadband network with publisher content and customized content, wherein the second consumer is identified by a second IP address allocated to the second consumer device by the second mobile broadband network;

identifying a second operator domain to which the second consumer is a subscriber via the second IP address of the second consumer device, the second operator domain being associated with the second mobile broadband network different than the first operator domain and one of a plurality of operator domains;

identifying a second node IP address of a second node in the second operator domain, the second node IP address identified via the identified second operator domain;

using the second node IP address, requesting from the second node in the second operator domain a second consumer profile for the second consumer, wherein the request includes the second IP address of the second consumer device for use in locating the second consumer profile;

receiving the second consumer profile from the second node in the second operator domain;

selecting customized content based on the received second consumer profile;

detecting if a second browser of the second consumer device is a mobile browser or a personal computer web browser and a capability thereof; and providing the publisher with the selected customized content for the publisher to combine with publisher content, the combined customized content and publisher content to be provided to the second consumer device based on the capability of the browser.

2. The method according to claim 1, wherein the network node is coupled to, but independent of, the first and second mobile broadband networks.

3. The method according to claim 1, wherein the first consumer profile for the first consumer can be retrieved by mapping the first IP address of the first consumer device to a first subscriber identity used in the operator domain, and retrieving the first consumer profile which is associated with the first subscriber identity.

4. The method according to claim 3, wherein the subscriber identity used in the operator domain is a Mobile Station International Subscriber Directory Number (MSISDN).

5. The method according to claim 1, wherein the selected customized content is fetched from an advertisement network which selects the customized content based on the consumer profile.

6. A network node for providing customized content to a consumer device connected to a mobile broadband network, the network node comprising:
   a first interface configured to receive from a publisher a request for customized content, the publisher to provide a consumer of a consumer device connected to a mobile broadband network that is independent of the network node, with publisher content and customized content, wherein the consumer is identified by an Internet protocol (IP) address allocated to the consumer device by the mobile broadband network,
   a processor configured to:
      identify an operator domain to which the consumer is a subscriber via the IP address of the consumer device, the operator domain associated with the mobile broadband network and one of a plurality of operator domains;
      identify a node IP address of a node in the operator domain, the node IP address identified via the identified operator domain;
   a second interface configured to:
      use the node IP address to transmit a request to the node in the operator domain to request a consumer profile for the consumer, wherein the request includes the IP address of the consumer device for use in locating the consumer profile; and
      receive the consumer profile from the node in the operator domain;
   wherein the processor is further configured to:
      generate a request for customized content based on the received consumer profile;
      detect if a browser of the consumer device is a mobile browser or a personal computer web browser and a capability thereof, and
      select customized content based on the received consumer profile;
   wherein the first interface is configured to provide the publisher with the selected customized content for the publisher to combine with publisher content, the combined customized content and publisher content to be provided to the consumer device based on the capability of the browser.

7. The network node according to claim 6, wherein the subscriber identity used in the operator domain is a Mobile Station International Subscriber Directory Number (MSISDN).

8. The network node according to claim 6, wherein the consumer profile is associated with the consumer based on the IP address of the consumer device.

9. The network node according to claim 6, further comprising a further interface configured to fetch the selected customized content from an advertisement network which selects the customized content based on the consumer profile.

10. A method in a network node for providing customized content to a consumer device connected to a mobile broadband network, the network node being independent of the mobile broadband network, the method comprising:
   receiving a request from a publisher for customized content for a consumer device, the publisher to provide a consumer of the consumer device connected to the mobile broadband network with publisher content and customized content, wherein the consumer is identified by an Internet protocol (IP) address allocated to the consumer device by the mobile broadband network;
   identifying an operator domain to which the consumer is a subscriber via the IP address of the consumer device, the operator domain associated with the mobile broadband network and one of a plurality of operator domains;
   identifying a node IP address of a node in the operator domain, the node IP address identified via the identified operator domain;
   using the node IP address, transmitting a request to the node in the operator domain, the request requesting a consumer profile for the consumer, wherein the request includes the IP address of the consumer device for use in locating the consumer profile;
   receiving, at the network node, the consumer profile from the node in the operator domain;
   selecting, at the network node, customized content based on the received consumer profile;
   detecting, at the network node, if a browser of the consumer device is a mobile browser or a personal computer web browser and a capability thereof;
   providing, from the network node, the publisher with the selected customized content for the publisher to combine with publisher content, the combined customized content and publisher content to be provided to the consumer device based on the capability of the browser.

11. The method according to claim 10, wherein the consumer profile for the consumer can be retrieved by mapping the IP address of the consumer device to a subscriber identity used in the operator domain, and retrieving the consumer profile which is associated with the subscriber identity.

12. The method according to claim 11, wherein the subscriber identity used in the operator domain is a Mobile Station International Subscriber Directory Number (MSISDN).

13. The method according to claim 10, wherein the selected customized content is fetched from an advertisement network which selects the customized content based on the consumer profile.

* * * * *